United States Patent
Park et al.

(10) Patent No.: US 8,811,046 B2
(45) Date of Patent: Aug. 19, 2014

(54) PRIMARY SIDE VOLTAGE CONTROL IN FLYBACK CONVERTER

(75) Inventors: Yangsoo Park, Pleasanton, CA (US); Jinho Choi, Cupertino, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 319 days.

(21) Appl. No.: 13/159,252

(22) Filed: Jun. 13, 2011

(65) Prior Publication Data

US 2012/0002449 A1    Jan. 5, 2012

Related U.S. Application Data

(60) Provisional application No. 61/360,369, filed on Jun. 30, 2010.

(51) Int. Cl.
*H02M 3/335* (2006.01)
(52) U.S. Cl.
USPC .................. 363/21.18; 363/21.12; 363/21.13
(58) Field of Classification Search
USPC ...................................... 363/20, 21.12–21.18
See application file for complete search history.

(56) References Cited

U.S. PATENT DOCUMENTS

| | | | | |
|---|---|---|---|---|
| 6,956,750 | B1 * | 10/2005 | Eason et al. | 363/21.01 |
| 7,615,891 | B2 * | 11/2009 | Wu et al. | 307/66 |
| 2005/0024898 | A1 | 2/2005 | Yang et al. | |
| 2005/0270000 | A1 | 12/2005 | Chang et al. | |
| 2006/0066288 | A1 * | 3/2006 | Wheeler et al. | 323/282 |
| 2007/0274106 | A1 * | 11/2007 | Coulson et al. | 363/21.12 |
| 2010/0157630 | A1 | 6/2010 | Polivka et al. | |
| 2011/0157922 | A1 * | 6/2011 | Konecny et al. | 363/21.12 |

OTHER PUBLICATIONS

PCT International Search Report, Application No. PCT/US11/40220, Oct. 3, 2011.

\* cited by examiner

*Primary Examiner* — Adolf Berhane
*Assistant Examiner* — Gustavo Rosario Benitez

(57) ABSTRACT

In one embodiment, an apparatus includes a sampling component. The sampling component receives a first voltage signal on a primary side of a transformer and monitors the first voltage signal to determine a voltage sampling time. The determined voltage sampling time is when the first voltage signal is used to estimate a second voltage level on a secondary side of the transformer. The first component further samples the first voltage signal at the voltage sampling time to determine a first voltage level. A second component outputs a control signal to control a switch to regulate the second voltage level based on the first voltage level.

18 Claims, 6 Drawing Sheets

PRIMARY SIDE VOLTAGE CONTROL IN FLYBACK CONVERTER

CROSS REFERENCE TO RELATED APPLICATIONS

The present disclosure claims priority to U.S. Provisional App. No. 61/360,369 for "Single Stage Flyback Primary Side Voltage Control" filed Jun. 30, 2010, which is incorporated herein by reference in its entirety for all purposes.

BACKGROUND

Particular embodiments generally relate to voltage estimation.

Unless otherwise indicated herein, the approaches described in this section are not prior art to the claims in this application and are not admitted to be prior art by inclusion in this section.

The use of electronic devices is popular in stationary and mobile environments. One kind of visual display is typically used in both environments. For example, the same kind of visual display is used in electronic devices from large sign/advertising boards to cellular phones or portable game players. Energy consumption is a concern in the design of the electronic devices. For example, in the marketplace, an electronic device that uses less energy may take significant precedence over other devices.

Light-emitting diodes (LEDs) are being used in displays because of the LEDs' energy efficiency, reliability, low maintenance, and environmental friendliness. LEDs have been used in various devices, such as signal devices (e.g. traffic lights, exit signs, and signboards) as well as in some illumination devices, such as flashlights. Additionally, LEDs may be used in light sources for general illumination in homes to commercial applications. LEDs have many advantages, such as long life, energy savings, better quality light output, safety, size, and durability.

A single-stage flyback solution is used because of the flyback solution's simplicity and cost reduction. The flyback solution requires that an output voltage be detected on the secondary side of a transformer of the flyback solution. This increases the amount of components in the implementation, such as output components, secondary constant current control circuits, and an optocoupler are needed on the secondary side. These components are used to detect the output voltage on the secondary side and then send the output voltage back to the primary side. The detected output voltage is used by the primary side to adjust an on and off time of a switch in the flyback solution to regulate the output voltage.

SUMMARY

In one embodiment, an apparatus includes a sampling component. The sampling component receives a first voltage signal on a primary side of a transformer and monitors the first voltage signal to determine a voltage sampling time. The determined voltage sampling time is when the first voltage signal is used to estimate a second voltage level on a secondary side of the transformer. The first component further samples the first voltage signal at the voltage sampling time to determine a first voltage level. A second component outputs a control signal to control a switch to regulate the second voltage level based on the first voltage level.

In one embodiment, the sampling time is at a point when it is determined a current in the secondary side is zero.

In one embodiment, the first voltage level is used to estimate the second voltage level of a second voltage signal on the secondary side of the transformer at a time when the second voltage level equals an output voltage on the secondary side.

In one embodiment, the first component is configured to: detect a first time when the first voltage signal reaches a first level; detect a second time when the first voltage signal reaches a second level; and use the first time and the second time to determine the sampling time.

In one embodiment, a system includes a primary winding on the primary side of the transformer and a secondary winding on the secondary side of the transformer and a bias winding on the primary side of the transformer, wherein the first voltage signal is received from the bias winding.

In one embodiment, a method receives a first voltage signal on a primary side of a transformer and monitors the first voltage signal to determine a voltage sampling time. The determined voltage sampling time is when the first voltage signal is used to estimate a second voltage level on a secondary side of the transformer. The method also samples the first voltage signal at the voltage sampling time to determine a first voltage level and outputs a control signal to control a switch to regulate the second voltage level based on the first voltage level.

In one embodiment, determining the voltage sampling time includes: detecting a first time when the first voltage signal reaches a first level; detecting a second time when the first voltage signal reaches a second level; and using the first time and the second time to determine the sampling time.

The following detailed description and accompanying drawings provide a more detailed understanding of the nature and advantages of the present invention.

DETAILED DESCRIPTION

Described herein are techniques for a voltage estimation system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
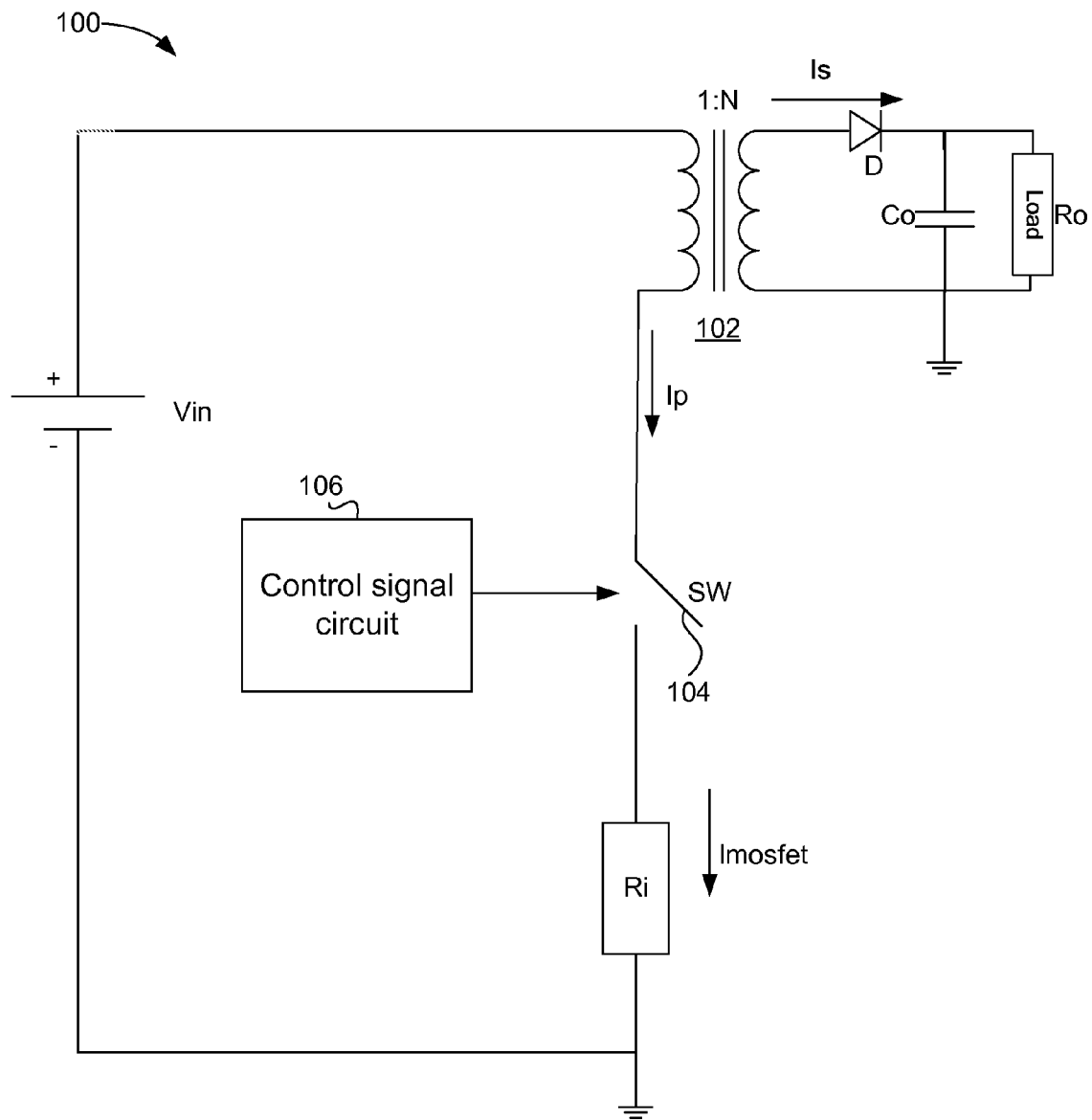
FIG. 1 depicts an example circuit for estimating an output voltage according to one embodiment.

FIG. 1 depicts an example circuit 100 for an output voltage according to one embodiment. Circuit 100 includes a transformer 102, a switch (SW) 104, an input voltage $V_{in}$, a diode (D), a capacitor ($C_o$), a load ($R_o$), and an input resistor ($R_i$). In one embodiment, circuit 100 may be a single-stage flyback solution; however, other circuits may be used. A primary current ($I_p$) is a current through a primary side of transformer 102. A secondary current ($I_s$) is a current through the secondary side of transformer 102.

When switch 104 is on, the primary side of transformer 102 is directly connected to input voltage $V_{in}$. The primary current equals a current Imosfet through switch 104 when switch 104 is on. When switch 104 is on, this results in an increase of magnetic flux in a primary winding of transformer 102. The voltage across a secondary winding of transformer 102 is negative such that diode D is reverse-biased (e.g., blocked). At this time period, capacitor $C_o$ supplies energy to load $R_o$. In one embodiment, load $R_o$ may be a LED/LED string that is being driven by circuit 100, but other loads may be used. When switch 104 is off, the energy stored in the primary winding of transformer 102 is transferred to the secondary winding. The energy is then transferred to capacitor $C_o$ and load $R_o$ through diode D, which is forward biased.

Particular embodiments use a bias voltage measured on the primary side of transformer 102 and use the measured bias voltage to regulate an output voltage on the secondary side of transformer 102. The bias voltage is sampled at a time in which it is determined that the bias voltage is substantially proportional to the output voltage by the transformer winding turn ratio. The measured bias voltage is then used to adjust a control signal that is used to control switch 104. For example, the measured bias voltage is compared to a reference and the comparison is used to adjust a duty cycle of the control signal to a transistor. In one example, a control signal circuit 106 is used to measure the bias voltage, perform the comparison, and output the control signal that turns switch 104 on and off. The on and off time may be varied regulate the output voltage. In one embodiment, this may control the power provided to the LED/LED string. Using the bias voltage to estimate the output voltage reduces the complexity of circuitry on the secondary side.

Figure 2:
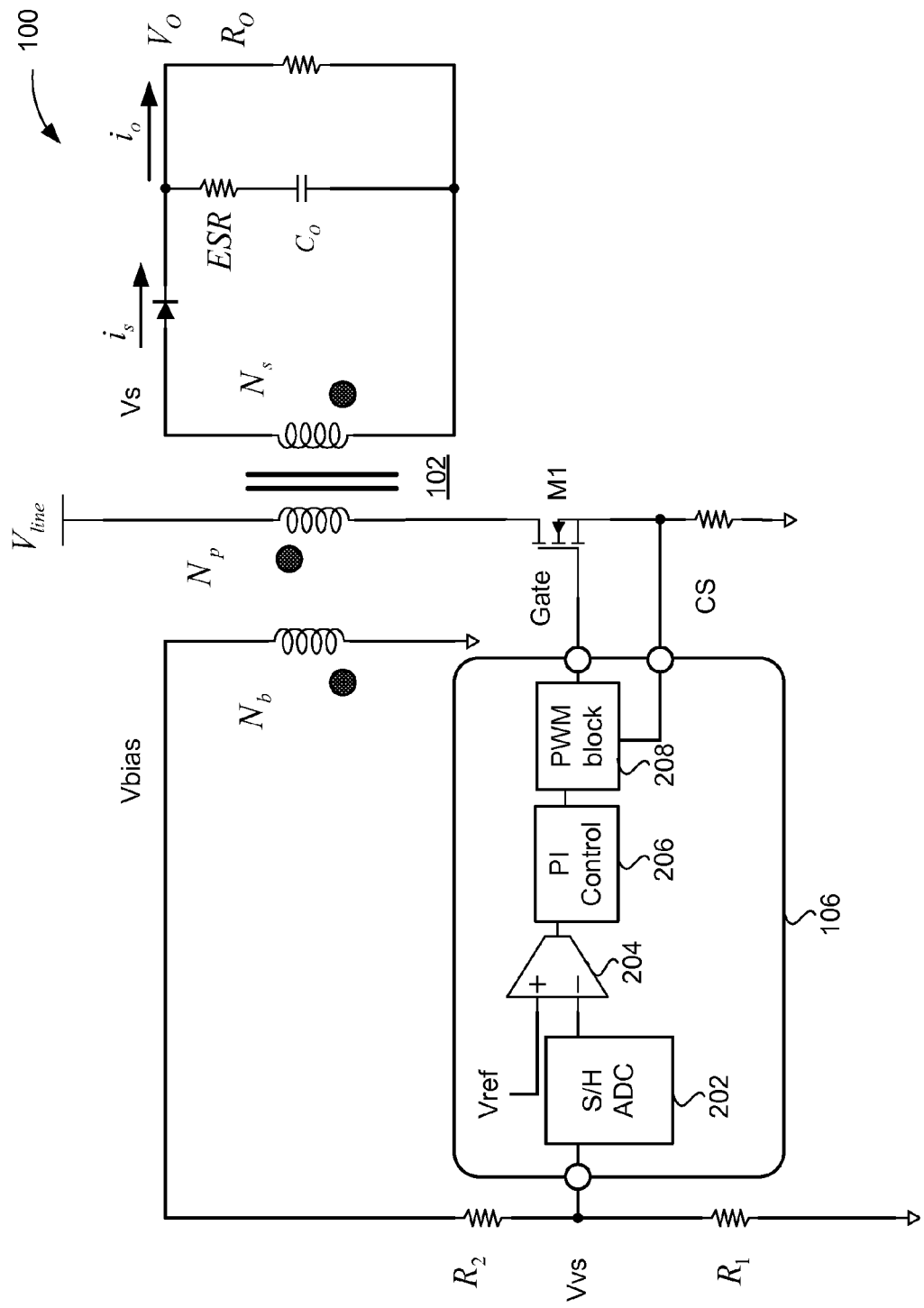
FIG. 2 depicts a more detailed example of the circuit according to one embodiment.

FIG. 2 depicts a more detailed example of circuit 100 according to one embodiment. Transformer 102 includes a primary winding $N_p$ and a secondary winding $N_s$. A turn-ratio of transformer 102 is $N=N_p/N_s$. A bias winding $N_b$ is also provided to allow a bias voltage Vbias to be measured on a primary side of transformer 102. The bias voltage may also be measured on the primary winding. Bias voltage Vbias is the voltage at the bias winding and secondary voltage Vs is the voltage at the secondary winding. In one embodiment, the number of turns for the bias winding is equal to the number of turns for the secondary winding. In other embodiments, the number of turns for the bias winding may be different from the number of turns of a secondary winding, and the turn-ratio between the bias winding and the secondary winding may be used to estimate the output voltage. For example, the following equation may be used to determine the relationship between Vbias and Vs:

$Nb/Ns=Vbias/Vs$

Vbias: The voltage on Nb
Vs: The voltage on Ns

The output voltage $V_o$ is defined by the equation $V_o=Vs-(Vf+I_s*ESR)$. Vf is the drop across diode D and ESR is the equivalent series resistance of capacitor $C_o$. When the secondary current is not zero, the output voltage may not be exactly proportional to the bias voltage Vbias. When the secondary current is zero, the output voltage equals the secondary voltage. The diode drop is zero and also there is no voltage across the ESR of capacitor $C_o$.

In one embodiment, the bias voltage that is sampled, voltage Vvs, is through a resistor divider. As will be described below, the sampled voltage Vvs is sampled at a time in which the output voltage equals the secondary voltage. The sampled voltage is then used to regulate the output voltage. For discussion purposes, the bias voltage Vbias and voltage Vvs may be used interchangeably. It will be understood that the bias voltage Vbias may be sampled through various resistor dividers as long as the resistance ratio is known. The relationship of the output voltage to the sampled voltage is defined by:

$$Vvs = (R1 + R2)/(R1 * Vbias)$$

$$V_o = Vvs \cdot \frac{R_1 + R_2}{R_2} \cdot \frac{N_s}{N_{bias}}$$

Figure 3:
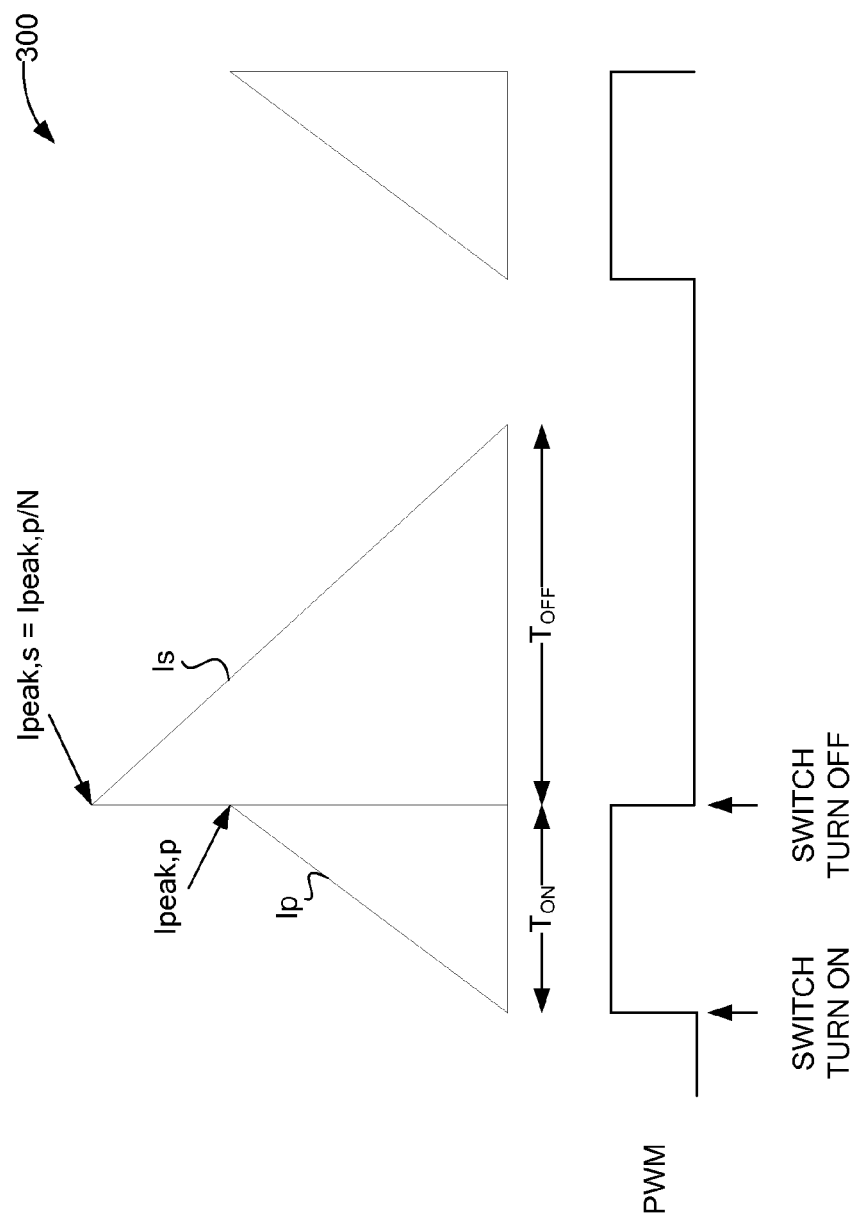
FIG. 3 depicts a graph showing the relationship between the primary current and the secondary current according to one embodiment.

The time to sample the bias voltage may be based on the current on the secondary side. FIG. 3 depicts a graph 300 showing the relationship between the primary current and the secondary current according to one embodiment. The control signal (PWM) shows the turn on time and turn off time of switch 104. In one example, switch 104 may be implemented using MOSFET M1 that is turned on and off to close switch 104 and open switch 104.

An on time $T_{ON}$ is the switch on time. A constant on time $T_{ON}$ is applied for a half line cycle. The off time $T_{OFF}$ is defined by the duration of turning switch 104 off to allow the secondary current $I_s$ to reach zero. A peak current $I_{peak,p}$ of the primary side and the peak current of the secondary side, $I_{peak,p}$, may be related based on a turn ratio N of transformer 102.

The bias voltage should be sampled when the secondary current goes to zero. Secondary current goes to zero when the energy in the secondary winding is fully discharged into capacitor $C_o$ and load $R_o$. The current slope is determined by the inductance value of transformer 102. The peak current on the primary side may be equal to $I_{peak,p}=Vline*Ton/Lm$, where:
Vline is the input line voltage and Vline=Vrms*root2 sin (theta)
Ton: MOSFET On-time
Lm: Magnetizing Inductance The secondary current may be related to the primary current by the turn-ratio $N=N_p/N_s$. The following equations provide the secondary current:

$N=Np/Ns$ $Is=N*Ip$ $Is=N*Vo*Toff/Lm$

Figure 4:
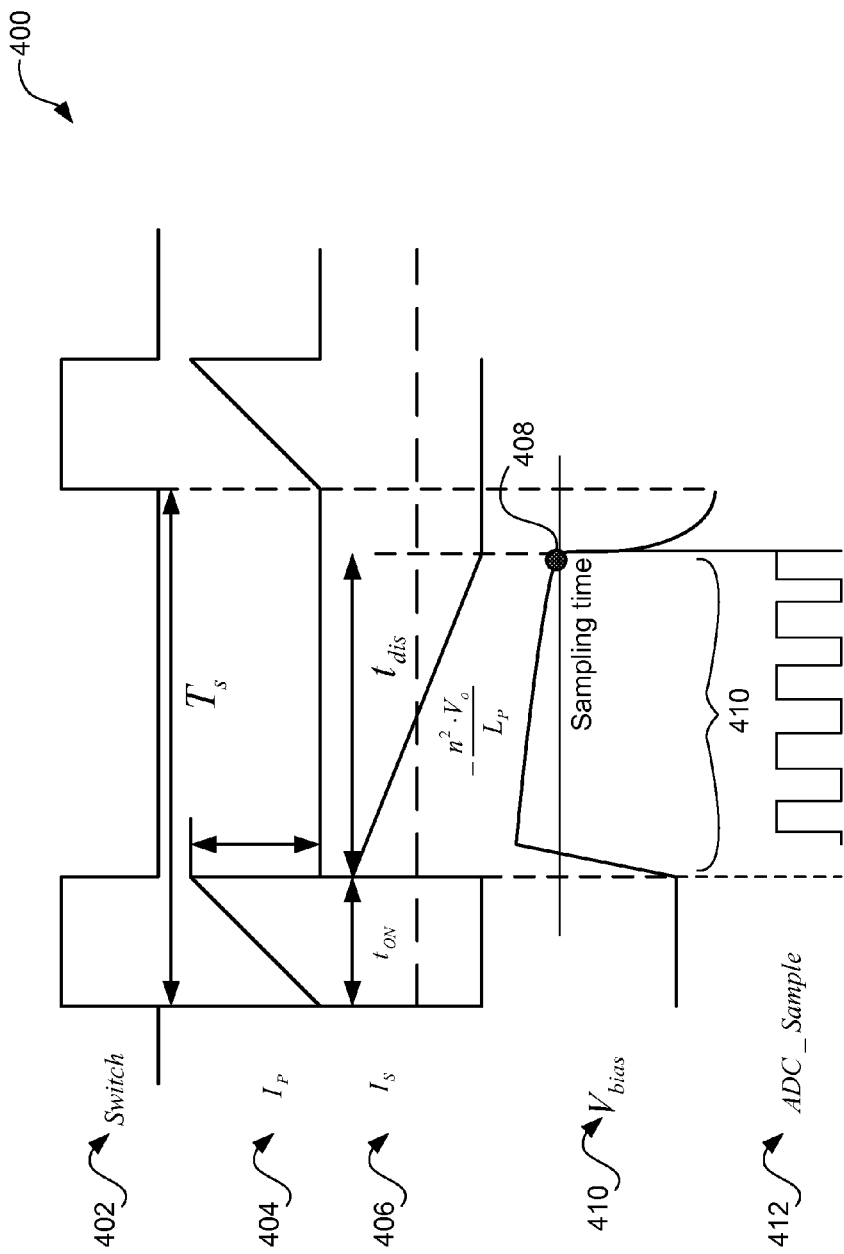
FIG. 4 depicts a graph showing a sampling time according to one embodiment.

When the secondary current goes to zero, the bias voltage should be sampled. FIG. 4 depicts a graph 400 showing a sampling time according to one embodiment. At 402, the on-time and off-time of switch 104 is shown. For example, the on-time is when a MOSFET M1 is on and the off-time is when MOSFET M1 is off. A cycle may be defined by the on-time and off-time of MOSFET M1 and is shown as a time $T_s$. MOSFET M1 may turn on and turn off multiple times in a half line cycle of an input to the primary side of transformer 102.

At 404, primary current $I_p$ is shown and, at 406, secondary current $I_s$ is shown. The primary current and secondary current are the same as shown in FIG. 3. For example, the primary current increases during the on-time of MOSFET M1 and the secondary current decreases during the off-time of MOSFET M1. A sampling time at 408 is desired when a secondary current discharges and reaches zero. This time is shown as a time $t_{dis}$. The slope of the secondary current may be defined as $$-\frac{N^2 \cdot V_o}{L_P}.$$

$L_p$ is the magnetizing inductance of the primary winding and N is the turn ratio.

It is desirable to sample the voltage Vbias at this point because Vbias may be substantially the same value as the output voltage Vo. For example, when MOSFET M1 turns off, energy is delivered to a secondary side through diode D. When diode D turns on and delivers energy to the secondary side, the waveform Vbias is flattened and is sometimes called "the knee". This portion is shown at 410. Before the secondary current is zero, the diode drop across diode D is reflected into the secondary voltage. If the bias voltage is detected when the diode drop is reflected into the secondary voltage, then the bias voltage may not be accurate. After fully discharging the secondary current into capacitor $C_o$ and load $R_o$, the voltage Vbias starts ringing based on the magnetizing inductance of the primary winding and a parasitic output capacitance of MOSFET M1. This may be referred to as the "magnetizing resonance frequency". When the voltage Vbias is sampled at the sampling point before the ringing starts, the secondary current is zero and the voltage of the diode drop is not reflected into voltage Vbias. For example, in this case, $Vs=V_o$. Thus, the bias voltage can be used as an accurate estimate of the output voltage.

Vbias may be sampled during any edge transition of an ADC_Sample waveform at 412. One of these transitions is selected as the sampling time. As will be discussed in more detail below, an analog-to-digital converter (ADC) samples voltage Vbias on the edge of the ADC_Sample waveform. If voltage Vbias is sampled at a time before the point shown at 408, an accurate reading for the output voltage may not be received. Thus, it is desirable to determine the sampling time be as close to point 408 as possible.

Referring back to FIG. 2, the process of using the sampled voltage at the sampling time will be described in more detail. The bias voltage is sampled at a point Vvs. The voltage Vvs that is input into control signal circuit 106 is defined by a resistor divider including the resistors R1 and R2. Voltage Vvs may be represented by the equation Vvs=(R1+R2)/(R1*Vbias).

Voltage Vvs is input into an ADC 202, which may be a sample and hold (S/H) ADC that samples voltage Vvs. Possible sampling points are based on sampling clock ADC_Sample. The sampling time is detected using logic in ADC 202 (described below) and the sampled value at the sampling time is selected and output to an amplifier 204. A reference Vref is also input into amplifier 204. The reference Vref may be an internal reference generated in the chip. The reference is used to determine how to regulate the output voltage. Depending on the values of voltage Vvs and the reference Vref, amplifier 204 outputs an error value. A proportional integral (PI) control 206 calculates a duty cycle for a pulse width modulator (PWM) signal based on the error value. The duty cycle is input into a pulse width modulator (PWM) block 208, which generates the PWM signal to input into a gate of MOSFET M1. The turn-off and turn-on time of MOSFET M1 may be adjusted to regulate the output voltage. For example, the duty cycle of a PWM signal input into the gate of MOSFET M1 may be adjusted to alter the turn-on time of MOSFET M1.

Altering the turn-on time has the effect of regulating the output voltage. For example, if voltage Vvs is lower than the reference Vref, the error signal is negative. The duty cycle of the PWM signal may be increased to increase the turn-on time of MOSFET M1, which stores more energy in the primary winding of transformer 102. When transistor M1 is turned off, the energy transferred to the secondary side may increase. This increases the secondary current, which increases the output voltage. The opposite is true when the turn-on time of transistor M1 is reduced. This process may be used to regulate the output voltage.

Figure 5:
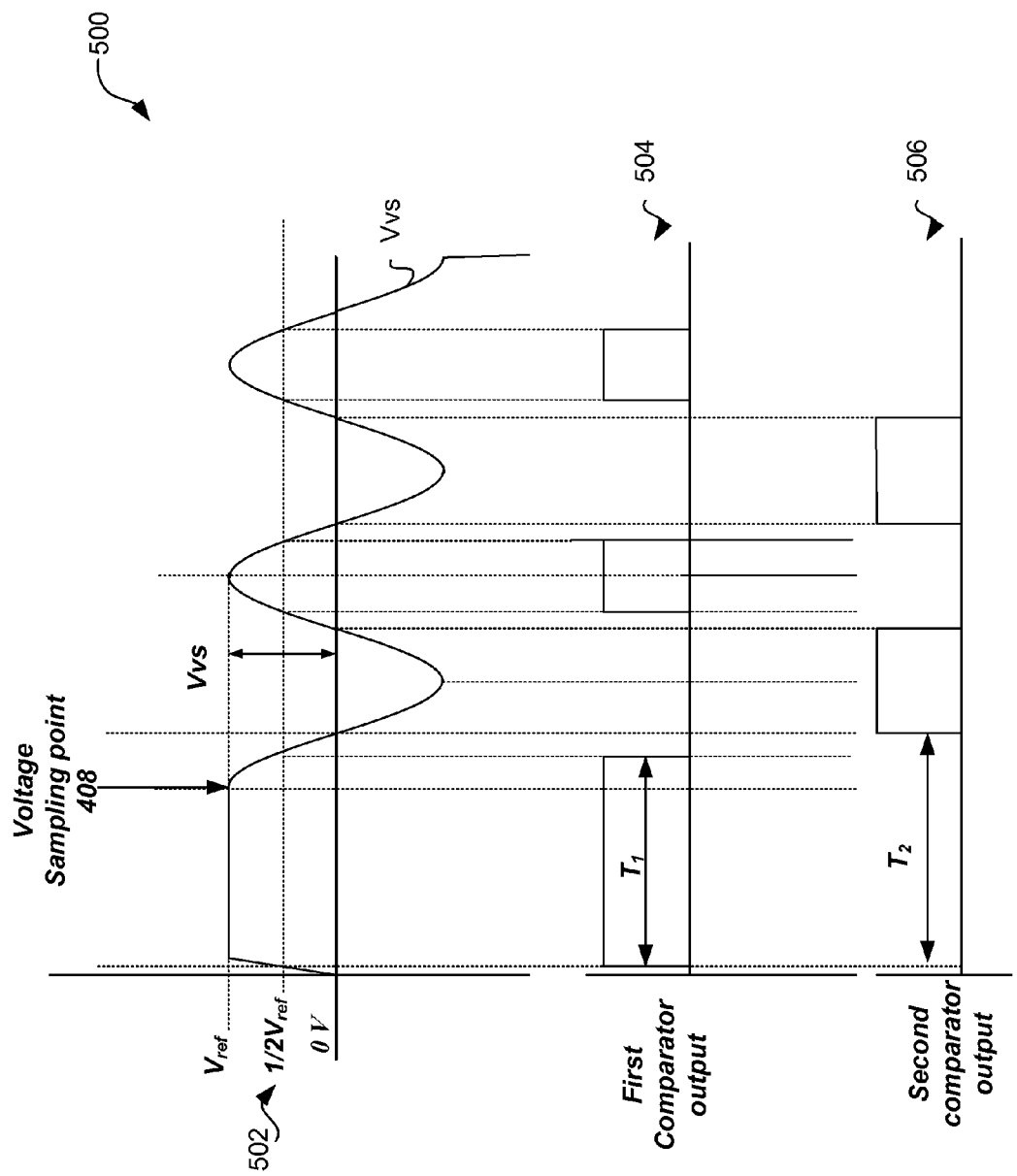
FIG. 5 shows a graph showing waveforms used to detect the sampling time according to one embodiment.

Different logic may be used to determine the sampling time. The logic may be found inside of ADC 202 and/or be external to ADC 202. In one embodiment, two comparators may be used to determine the sampling time, but other implementations may be used. FIG. 5 shows a graph 500 showing waveforms used to detect the sampling time according to one embodiment. At 502, the waveform for voltage Vvs is shown. Voltage sampling point at 408 is shown before the ringing occurs.

At 504, a graph of an output for a first comparator is shown. The first comparator compares the voltage Vvs to a first reference value that is equal to one-half of the reference voltage Vref. The level of reference voltage Vref and reference voltage ½Vref is shown on the Y-axis of graph 502. The ½Vref value may be Vref*cosine (60°)=½Vref. This equation may be used because the resonance frequency is a cosine waveform.

At 506, a graph for the output for a second comparator is shown. The second comparator compares the voltage Vvs with ground (0V). The output of the first comparator and the second comparator generate timing signals that are used to determine the voltage sampling time. The timing signals are determined based on a present cycle (i.e., a turn-on and turn-off time of MOSFET M1), and used to determine the voltage sampling time for the next cycle (the next turn-on and turn-off time for MOSFET M1). For example, the sampling time as a function of the time from the turn on time of MOSFET M1 is determined in a present cycle. This time may be used from the turn on time of MOSFET M1 in a next cycle.

The first comparator measures a time T1 in which the resonance frequency goes below reference voltage ½Vref. In this case, the signal output by the first comparator goes low. The second comparator measures a time T2 when the resonance frequency goes below zero or passes the voltage 0V. In this case, the signal output by the second comparator goes high.

To determine the voltage sampling time, the following equations may be used:

$\Delta T = T2 - T1.$

Voltage sampling time=T1−2*ΔT [Vref*cosine (60°)=½Vref]

Time ΔT is the difference between time T2 and time T1. The on-time prediction is the time in which it is predicted where the valley switching point is reached and MOSFET M1 turns on again. In this case, the valley switching point is known as the constant peak current provides the same turn-on and turn-off timing. The voltage sampling time for the next cycle can then be determined as T1−2*ΔT. In this case, as of the symmetric shape of the resonance frequency, taking the difference between the half-way point and the 0V level and subtracting that from the time T1 yields the sampling point in which the secondary current goes to zero and the bias voltage starts ringing in the next cycle. The resonance frequency is symmetrically equivalent for a half line cycle. Thus, determining times T1 and T2 allows the prediction of the voltage sampling time for the next cycle of turning MOSFET M1 on and off in the half line cycle.

The sampling time may vary and may be calculated every cycle such that an accurate sampling time is used. In one embodiment, a variable input voltage is input to circuit 100. The variable input voltage affects the external capacitance Coss value of MOSFET M1. When the input voltage diminishes, the magnetizing inductance resonance frequency is also changed. Both of these factors may affect when the appropriate sampling time should be (due to a change in the slope of the secondary current). To guard against changes in the sampling time, the timing signals may be determined every cycle by the first comparator and second comparator to ensure the voltage sampling time is accurately determined within a threshold. By determining the sampling time every cycle, gradual changes to the sampling time are reflected due to variations in the input voltage. Slight changes between two consecutive cycles may occur, but these changes may be slight and be within an error tolerance. Although every cycle is used to detect the next sampling time, other methods may be used, such as once a half line cycle.

Figure 6:
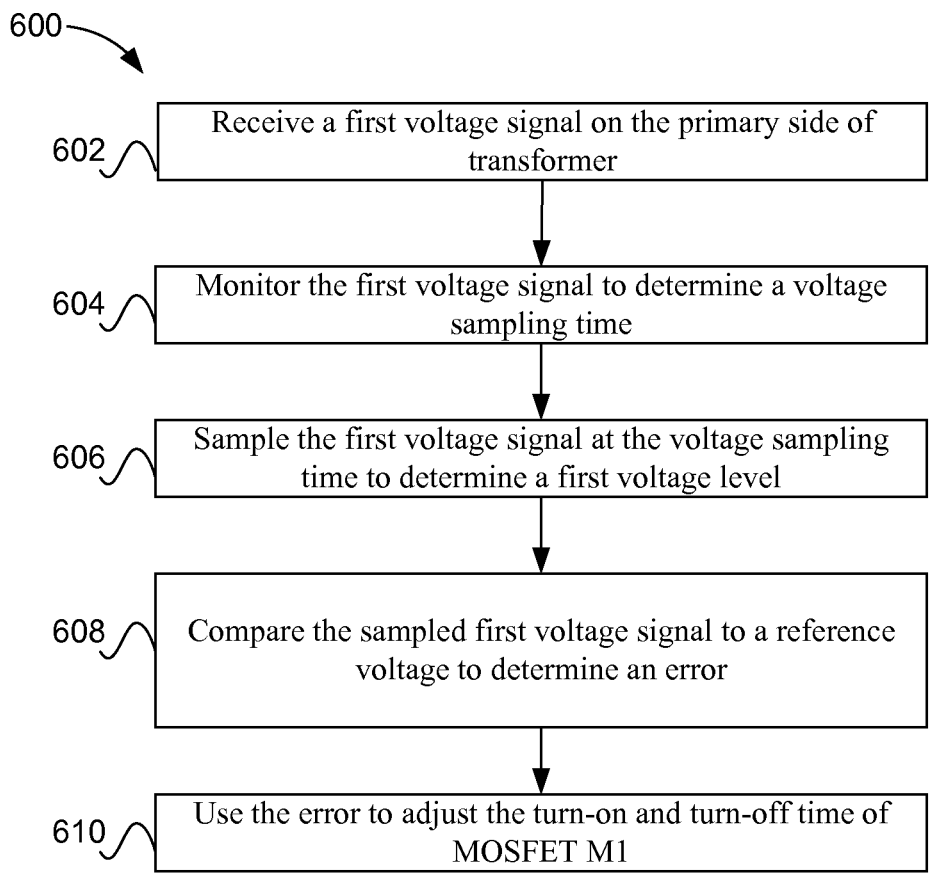
FIG. 6 depicts a simplified flowchart of a method for determining the sampling time according to one embodiment.

FIG. 6 depicts a simplified flowchart 600 of a method for determining the sampling time according to one embodiment. At 602, a first voltage signal is received on the primary side of transformer 102. For example, the bias voltage associated with a bias winding is determined.

At 604, the first voltage signal is monitored to determine a voltage sampling time. For example, the voltage levels for the first voltage signal may be monitored for a previous cycle in which MOSFET M1 was turned on and turned off. This monitoring is used to determine a voltage sampling time to sample the first voltage signal.

At 606, the first voltage signal is sampled at the voltage sampling time to determine a first voltage level. The first voltage level is used to estimate the second voltage level of a second voltage signal on the secondary side of transformer 102. At 608, the sampled first voltage signal is compared to a reference voltage to determine an error.

At 610, the error is used to adjust the turn-on and turn-off time of MOSFET M1. For example, a duty cycle of a PWM signal is adjusted to adjust the ON time of MOSFET M1.

Accordingly, particular embodiments use a voltage Vbias that is determined on the primary side to estimate the output voltage on the secondary side. This eliminates the need for secondary side components to detect the output voltage and send the output voltage back to the primary side for use in voltage regulation.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. An apparatus comprising:
a sampling component configured to:
receive a first voltage signal on a primary side of a transformer;
detect a first time (T1) when the first voltage signal reaches a first level;
detect a second time (T2) when the first voltage signal reaches a second level;
determining a voltage sampling time according to the equation T1−2*(T2−T1), wherein the determined voltage sampling time is when the first voltage signal is used to estimate a second voltage level on a secondary side of the transformer; and
sample the first voltage signal at the voltage sampling time to determine a first voltage level;
a second component configured to output a control signal to control a switch to regulate the second voltage level based on the first voltage level.

2. The apparatus of claim 1, wherein the voltage sampling time is at a point when it is determined a current in the secondary side is zero.

3. The apparatus of claim 1, further comprising a third component configured to:
compare the first voltage level to a reference voltage; and
output an error signal.

4. The apparatus of claim 3, further comprising a fourth component configured to use the error signal to adjust an on time of the switch.

5. The apparatus of claim 4, wherein:
the control signal comprises a pulse width modulation (PWM) signal, and
the fourth component is configured to adjust a duty cycle of the pulse width modulation (PWM) signal to adjust the on time of the switch.

6. The apparatus of claim 1, wherein the first voltage level is used to estimate the second voltage level of a second voltage signal on the secondary side of the transformer at a time when the second voltage level equals an output voltage on the secondary side.

7. A system comprising the apparatus of claim 1, the system further comprising:
a primary winding on the primary side of the transformer and a secondary winding on the secondary side of the transformer; and
a bias winding on the primary side of the transformer, wherein the first voltage signal is received from the bias winding.

8. The system of claim 7, wherein the bias winding has a same number of turns as the secondary winding.

9. A method comprising:
receiving a first voltage signal on a primary side of a transformer;
detecting a first time when the first voltage signal reaches a first level;
detecting a second time when the first voltage signal reaches a second level;
determining a voltage sampling time according to the equation T1−2*(T2−T1), wherein the determined voltage sampling time is when the first voltage signal is used to estimate a second voltage level on a secondary side of the transformer;
sampling the first voltage signal at the voltage sampling time to determine a first voltage level; and
outputting a control signal to control a switch to regulate the second voltage level based on the first voltage level.

10. The method of claim 9, wherein the voltage sampling time is at a point when it is determined a current in the secondary side is zero.

11. The method of claim 9, wherein: a sampling time is determined using monitored voltage levels during a first cycle, and the sampling is performed at the voltage sampling time in a second cycle.

12. The method of claim 11, wherein:
the first cycle comprises a turn on time of the switch and a turn off time of the switch, and
the second cycle comprises a next turn on time of the switch and a next turn off time of the switch.

13. The method of claim 9, wherein the first voltage level is used to estimate the second voltage level of a second voltage signal on the secondary side of the transformer at a time when the second voltage level equals an output voltage on the secondary side.

14. The method of claim 9, further comprising:
comparing the first voltage level to a reference voltage; and
outputting an error signal.

15. The method of claim 14, further comprising using the error signal to adjust an on time of the switch.

16. The method of claim 15, wherein the control signal comprises a pulse width modulation (PWM) signal, the method further comprising:
adjusting a duty cycle of the pulse width modulation (PWM) signal to adjust the on time of the switch.

17. The method of claim 9, wherein the first voltage signal is received from a bias winding on the primary side of the transformer.

18. The method of claim 17, wherein the bias winding has a number of turns equal to a number of turns of a secondary winding on the secondary side.

* * * * *